(12) United States Patent
Byrne

(10) Patent No.: US 11,585,442 B2
(45) Date of Patent: Feb. 21, 2023

(54) HOSE COUPLING SEAL

(71) Applicant: Jeanette Byrne, Glenelg North (AU)

(72) Inventor: David Byrne, Glenelg North (AU)

(73) Assignee: Jeanette Byrne, Glenelg North (AU)

( * ) Notice: Subject to any disclaimer, the term of this patent is extended or adjusted under 35 U.S.C. 154(b) by 300 days.

(21) Appl. No.: 16/965,345

(22) PCT Filed: Jan. 22, 2019

(86) PCT No.: PCT/AU2019/050038
§ 371 (c)(1),
(2) Date: Jul. 28, 2020

(87) PCT Pub. No.: WO2019/144181
PCT Pub. Date: Aug. 1, 2019

(65) Prior Publication Data
US 2021/0123528 A1      Apr. 29, 2021

(30) Foreign Application Priority Data

Jan. 29, 2018 (AU) ................................ 2018900260

(51) Int. Cl.
*F16J 15/10* (2006.01)
*F16J 15/02* (2006.01)
(Continued)

(52) U.S. Cl.
CPC ........... *F16J 15/104* (2013.01); *F16J 15/022* (2013.01); *F16J 15/025* (2013.01); *F16J 15/121* (2013.01);
(Continued)

(58) Field of Classification Search
CPC ..... F16L 17/025; F16L 17/032; F16L 17/035; F16L 17/067; F16L 17/073; F16L 23/18;
(Continued)

(56) References Cited

U.S. PATENT DOCUMENTS 1,300,414 A * 4/1919 Klell ..................... F16L 37/252
285/379
2,950,130 A * 8/1960 Schneider ............... F16L 37/26
285/99

(Continued)

FOREIGN PATENT DOCUMENTS

WO    2013126949    9/2013
WO    2016071583    5/2016

*Primary Examiner* — Nicholas L Foster
(74) *Attorney, Agent, or Firm* — Sand, Sebolt & Wernow Co., LPA

(57) ABSTRACT

There is proposed an annular seal for a pipe coupling, comprising, a lower portion beatable within an upwardly open annular groove in the pipe coupling, an upper portion having an upwardly facing abutment surface, a depending skirt and a stiffening ring. The depending skirt is configured for engagement over a circular upstand of the pipe coupling, which is located inwardly of the annular groove. The stiffening ring is located within the upper portion of the annular seal, and includes an annular portion that is generally parallel with and spaced apart from the abutment surface and at least one circumferential leg depending from the annular portion that provides reinforcement for the depending leg.

20 Claims, 12 Drawing Sheets

(51) Int. Cl.
*F16L 17/067* (2006.01)
*F16J 15/12* (2006.01)
*F16L 37/12* (2006.01)
F16L 23/18 (2006.01)
F16L 37/248 (2006.01)
F16L 37/252 (2006.01)

(52) U.S. Cl.
CPC ............ *F16L 17/067* (2013.01); *F16J 15/12* (2013.01); *F16L 23/18* (2013.01); *F16L 37/122* (2013.01); *F16L 37/248* (2013.01); *F16L 37/252* (2013.01)

(58) Field of Classification Search
CPC ....... F16L 23/22; F16L 37/122; F16L 37/248; F16L 37/252; F16J 15/022; F16J 15/025; F16J 15/104; F16J 15/12; F16J 15/121
See application file for complete search history.

(56) References Cited

U.S. PATENT DOCUMENTS

| | | | |
|---|---|---|---|
| 3,561,776 A | 2/1971 | Wilson | |
| 3,620,556 A | 11/1971 | Paddington | |
| D244,533 S * | 5/1977 | Eidelberg | D23/269 |
| 4,345,739 A * | 8/1982 | Wheatley | F16K 1/2263 251/900 |
| 5,409,337 A * | 4/1995 | Muyskens | F16J 15/121 285/379 |
| 5,588,656 A * | 12/1996 | Matsushima | F16J 15/3268 277/575 |
| 8,262,140 B2 * | 9/2012 | Santi | F16L 15/003 285/332.2 |
| 9,234,612 B2 * | 1/2016 | Santi | F16L 17/02 |
| 10,393,296 B2 * | 8/2019 | Quesada | F16L 21/03 |
| 10,612,660 B2 * | 4/2020 | Yanagi | F16J 15/125 |
| 11,333,248 B2 * | 5/2022 | Yanagi | F16J 15/061 |
| 2004/0026873 A1 * | 2/2004 | Davey | F16L 17/067 277/627 |
| 2006/0244222 A1 * | 11/2006 | Davey | F16L 17/067 277/608 |
| 2007/0273102 A1 * | 11/2007 | Schroeder | F16J 15/062 277/312 |
| 2008/0284108 A1 * | 11/2008 | Davey | F16L 17/067 277/399 |
| 2010/0181727 A1 * | 7/2010 | Santi | F16L 17/02 285/332.2 |
| 2011/0008101 A1 * | 1/2011 | Santi | E21B 17/042 403/288 |
| 2014/0001745 A1 | 1/2014 | Lehmann et al. | |
| 2014/0300099 A1 | 10/2014 | Lehmann et al. | |
| 2018/0094754 A1 * | 4/2018 | Quesada | F16L 21/03 |
| 2019/0032783 A1 * | 1/2019 | Yanagi | F16J 15/12 |
| 2019/0162342 A1 * | 5/2019 | Copeland | F16L 21/08 |
| 2019/0203837 A1 * | 7/2019 | Cann | F16L 23/18 |
| 2020/0191273 A1 * | 6/2020 | Yanagi | F16J 15/061 |

* cited by examiner

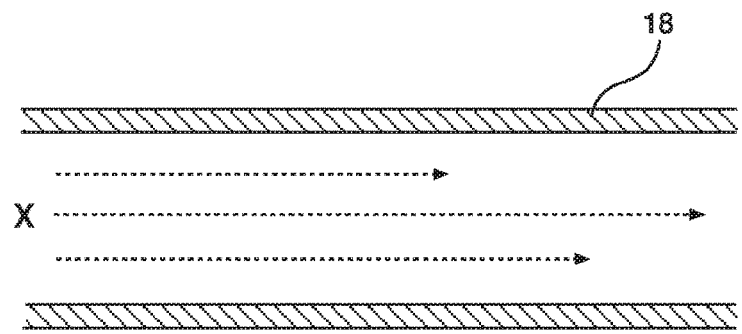
Figure 16
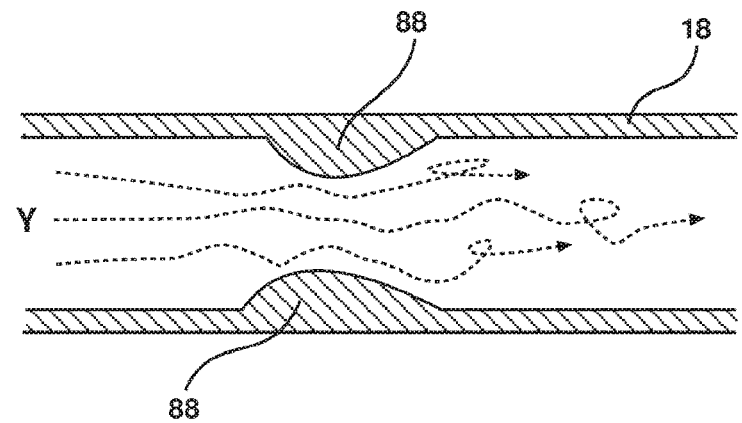
Figure 17 - Prior Art
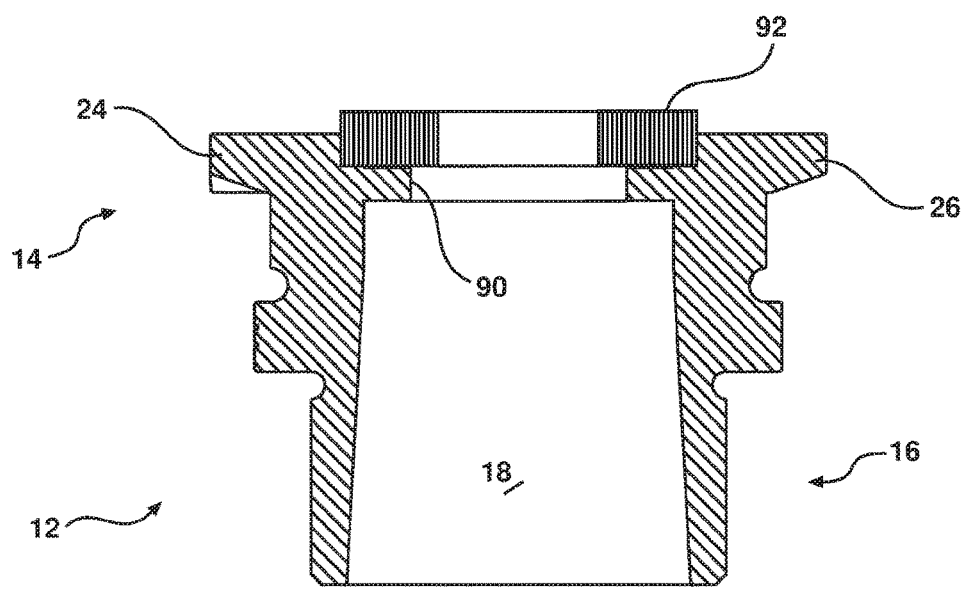
Figure 18 - Prior Art

| Market | Flow (l/s) | Power (kW) | Ultraflow | Flow (l/s) | Power (kW) |
|---|---|---|---|---|---|
| | 0.398 | 1.005 | | 0.385 | 1.946 |
| | 0.405 | 0.997 | | 0.400 | 1.948 |
| | 0.445 | 1.169 | | 0.412 | 1.659 |
| | 0.589 | 1.361 | | 0.415 | 1.691 |
| | 0.602 | 1.359 | | 0.432 | 1.661 |
| | 0.702 | 1.334 | | 0.440 | 1.688 |
| | 0.726 | 1.399 | | 0.468 | 1.956 |
| | 0.733 | 1.409 | | 0.567 | 2.377 |
| | 1.077 | 1.805 | | 0.584 | 2.375 |
| | 1.123 | 1.739 | | 0.848 | 2.631 |
| | 1.129 | 1.597 | | 0.851 | 2.620 |
| | 1.133 | 1.722 | | 0.861 | 2.731 |
| | 1.133 | 1.726 | | 0.864 | 2.743 |
| | 1.134 | 1.606 | | 1.210 | 3.028 |
| | 1.135 | 1.619 | | 1.212 | 2.995 |
| | 1.140 | 1.726 | | 1.214 | 2.995 |
| | 1.229 | 1.815 | | | |
| | 1.230 | 1.819 | | | |
| | 1.232 | 1.807 | | | |
| | 1.243 | 1.770 | | | |
| | 1.243 | 1.770 | | | |

Graph 1: Comparison of flow rate v power use test results for Ultraflow and Market connections. Log trendlines show a good match.

HOSE COUPLING SEAL

FIELD OF THE INVENTION

The present disclosure relates to a seal for a claw coupling and in one aspect relates to a reinforced coupling seal for a claw type coupling used on compressed gas hoses.

BACKGROUND OF THE INVENTION

Claw couplings are used in various commercial applications to connect lengths of hoses used in the transfer of fluids and compressed air. The use of claw coupling enables the temporary installation of hose systems, or enables the modification of existing infrastructure. It is generally favourable to inhibit the escape of the transferred air or fluid at these junction points since leakage can increase operational costs, as well as pose a health and safety risk.

One application in which claw coupling are commonly used is in the mining industry, in particular underground mines. This is because when new tunnels are dug during the mining operation, new pipe or hose sections need to be installed. Furthermore, the use of claw couplings allows for simplified removal when a tunnel is being decommissioned or modification of the pipe or hose sections are required.

Claw couplings used in the mining industry include the Type A claw coupling developed in Europe, Type B claw coupling developed in the USA, which both have a solid rubber seal, and the claw coupling sold under the brand SURELOK™ (S/L) that was developed in Australia, which includes a rubber bellows type seal. Claw couplings have a robust design and are able to withstand the harsh mining environment, while still providing a means for quick connection and disconnection.

Claw type couplings use two like fittings that can be pushed together and twisted to engage a retaining means, somewhat similar to a bayonet mount. To create an air or fluid seal, two rubber sealing rings are used between the fittings. These opposing rubber sealing rings abut each other when the fittings are joined.

Solid rubber seals have been traditionally used in Type A and Type B claw couplings, however more recently bellows type seals have been developed. These bellows type seals include a truncated toroidal portion at one end that fits into a correspondingly shaped sidewardly open annular cavity in the side of the passageway of the fitting, thereby providing a seal between the fitting and air or fluid path. At the other end of the seal a face abuts the sealing ring in an adjoining fitting. The truncated toroidal portion pushes against the shaped annular cavity to thereby inhibit movement of the air or fluid around the seal, and opposing face of the two adjoining seals abut to inhibit movement of the air or fluid therebetween, to thereby provide a seal for the claw coupling system.

Claw type couplings were designed to be predominately used in the underground mining industry to convey compressed air and water throughout the mine though rubber hoses and steel pipes. However, one of the major issues with the Type A and B couplings is that they are hard to connect, and leak or burst at low pressure. Furthermore, the couplings seals are in the flow path of the flowable substance and therefore the seal restricts the flow of the flowable substance passing through the pipe or hose, causing turbulence and medium hammer.

While the bellows type seal overcomes many of the problems, the seal still caused restrictive flow of the flowable substance and turbulence issues. This is because the seal is position in the side of the passageway and therefore creates turbulence in the flow of fluid or air. This results in inefficiencies in the machinery and higher operational costs. Furthermore, the extent to which the seal is exposed to the medium being transported through the coupling can have adverse effects, such as dislodgment of the seal under certain circumstances.

At low air or fluid pressures, below 345 kPa (50 P. S. I.), Type A and B couplings tend to leak. This can lead to the creation of dust, mud and other problems, which can hinder efficient work practices, increase operation costs and/or increase danger to personnel in the vicinity. At high pressures above 2756 kPa (400 P. S. I.), the seals can blow out from within the junction. When this occurs, work has to be halted and the broken section isolated and repaired before work can recommence. Furthermore, some of the existing seals tend to fold back upon themselves where they abut against an adjacent seal. This can result in a portion of the seal blowing out the side of the coupling or the seal otherwise become dislodged within the fluid passageway.

In the Inventor's previous patent application, PCT/AU2013/000172, there was disclosed a seal including a ring-shaped reinforcement member. The Inventor has however found that the inclusion of a ring-shaped reinforcement member within the seal body is insufficient to provide an adequate seal and to overcome all the problems associated with the prior art.

It should be appreciated that any discussion of the prior art throughout the specification is included solely for the purpose of providing a context for the present invention and should in no way be considered as an admission that such prior art was widely known or formed part of the common general knowledge in the field as it existed before the priority date of the application.

SUMMARY OF THE INVENTION

In one aspect of the invention, but not necessarily the broadest or only aspect, there is proposed a pipe coupling annular seal, comprising,
a lower portion locatable within an upwardly open annular groove in said pipe coupling,
an upper portion adjoining the lower portion and having an upwardly facing abutment surface,
a skirt adjoining said upper portion circumferentially around an inner edge thereof and depending therefrom, the depending skirt configured for engagement over a circular upstand of said pipe coupling, the circular upstand being located inwardly of said annular groove, and
a stiffening ring within at least said upper portion of the annular seal, wherein the stiffening ring including an annular portion that is generally parallel with and spaced apart from the abutment surface and at least one circumferential leg depending from said annular portion.

Preferably, the annular portion is generally flat and parallel with the abutment surface of the stiffening ring.

In one form the stiffening ring includes an inner depending circumferential leg adjoining an inner edge of the generally flat annular portion, and an outer circumferential leg adjoining an outer edge of the generally flat annular portion.

The annular portion, the inner circumferential leg and outer circumferential leg may be unitary in construction or joined to form the stiffening ring.

In one form the stiffening ring has an inverted squared off J-shaped cross-sectional profile.

In another form the stiffening ring has a generally inverted J-shaped cross-sectional profile, wherein the annular portion is curved and unitary with the circumferential legs.

Preferably, the outer circumferential leg extends downwardly to a greater extent than the inner circumferential leg. The outer circumferential leg may extend downwardly into or adjacent the lower portion of the seal, and the inner circumferential leg may extend downwardly into or adjacent the depending skirt.

Alternatively, the inner and outer circumferential legs are of a similar length, wherein the stiffening ring is generally U-shaped.

The inner circumferential leg may be tapered to a free end thereof.

The lower portion of the annular seal in one form comprises a bellows seal, which includes a circumferential depending projection being curved outwardly and including at least two radial ribs, which extend around an outer surface of the circumferential depending projection.

Preferably, the depending skirt tapers inwardly to a free circumferential edge, which is spaced apart from the lower portion of the annular seal.

The circular upstand of the pipe coupling is preferably tapered to an upper circumferential edge. More preferably the inner side of the circular upstand slopes outwardly toward the upper edge, and an outer side of the circular upstand is generally vertical.

In one form the depending skirt includes an inner side that is configured to be positioned generally parallel with the flow path of the pipe coupling. The depending skirt further includes an outer side that is oblique relative to the inner side. The outer side of the depending skirt is configured to abut with the inner side of the circular upstand.

Preferably, the upwardly open annular groove includes an enlarged inner annular chamber and an annular neck portion. In one form, an insert is engageable within the upwardly open annular groove to form the restricted annular neck portion. The insert may be press fitted and may be held in place by a bonding agent.

At least a part of the lower portion of the seal is positionable within the enlarged inner annular chamber and the upper portion preferably extending through and outwardly from, the restricted annular neck portion.

Preferably, when cooperating pipe coupling are connected, the abutment surfaces of the respective seals are caused to impinge upon each other to force a respective upper portion to retract inwardly of the neck portion of a respective annular groove.

The compression of the seal located in the annular groove or cavity also causes the tapered skirt to slide down the tapered upstand. In this way, when two cooperating couplings are connected together the respective seals do not extend significantly into the flow of flowable substance, which is passing through the pipe coupling junction. This thereby minimising turbulence, while still providing an adequate seal to inhibited leakage of the flowable substance therethrough.

The tapered skirt also inhibits movement of the flowable substance into the groove or cavity which would otherwise cause turbulence. The creation of laminar flow through the joined couplings has cost savings benefits, as well as reducing carbon emissions for industry. The reader should appreciate that the seal and the claw coupling work together to perform the sealing function.

The stiffening ring may be constructed from metal, plastic or any other suitable rigid or semi-rigid materials. In one form the stiffening ring is constructed from stainless steel and is press formed and has a thickness of between 0.3 mm and 1 mm, and preferably is 0.5 mm in thickness.

The insert may be constructed from the same or similar material as the pipe coupling.

The annular seal may be constructed from natural rubber or an artificial elastomer, synthetic rubber copolymer such as, Hydrogenated Acrylonitrile Butadiene (HNBR) or Acrylonitrile Butadiene (NBR) or any other suitable type of elastomeric material.

In another aspect of the invention there is proposed a claw coupling with annular seal, the annular seal comprising, a lower portion locatable within an upwardly open annular groove in the claw coupling, an upper portion having an upwardly facing abutment surface, a depending skirt extending circumferentially around an inner edge of the upper portion, the depending skirt configured for engagement with a circular upstand of the claw coupling, the circular upstand being located inwardly of the annular groove, and a stiffening ring within at least the upper portion of the annular seal, wherein the stiffening ring including an annular portion that is generally parallel with and spaced apart from the abutment surface, and at least one circumferential leg depending from the annular portion.

In still another aspect of the invention there is proposed a method of forming a seal between two cooperating couplings, including the steps of:
providing an annular seal for each of the couplings, each respective annular seal including a lower portion, an upper portion having an abutment surface, a depending skirt extending circumferentially around an inner edge of the upper portion, and a stiffening ring within at least the upper portion of the annular seal;
positioning at least the lower portion of each the annular seal within a respective outwardly open annular groove in the respective coupling;
connecting the cooperating couplings such that the abutments surfaces of the respective annular seals abut; and
tightening the cooperating couplings, whereby the annular seals are compressed and the depending skirt of each respective annular seal engages with a circular upstand of a respective coupling, the circular upstand being located inwardly of a respective annular groove to thereby provide a seal.

The above method including the step of inserting a respective insert into each of the outwardly open annular grooves, to thereby form an annular neck portion.

The skilled addresses will appreciate that the terms 'upper', 'lower', 'depending' and 'vertical' should be given their broadest definition since the coupling can be positioned at an angle from the vertical and the opposing coupling will be inverted. Accordingly, when considering the scope of the claims the annular seal and coupling should be orientated in a vertical position with the pipe coupling upwardly facing.

The phrase "pipe coupling" used through the specification should be given it broadest definition and include, pipe, hose or conduit coupling used to transfer any type of fluid or gas. Furthermore, the phrase "circular upstand" should be given it broadest definition and includes upstands that may generally annular or disc-like.

BRIEF DESCRIPTION OF THE DRAWINGS

The accompanying drawings, which are incorporated in and constitute a part of this specification, illustrate an implementation of the invention and, together with the description and claims, serve to explain the advantages and principles of the invention. In the drawings.

FIG. 16 is a schematic view illustrating laminar flow of fluid along a flow path of the present invention, having generally parallel side;

FIG. 17 is a schematic view illustrating turbulent flow of fluid along a flow path of the prior art, having a narrowing of the passageway;

FIG. 18 is a schematic stylised view of one claw coupling of the prior art illustrating the annular ridge that is configured to locate the seal;

DETAILED DESCRIPTION OF THE ILLUSTRATED AND EXEMPLIFIED EMBODIMENTS

Figure 1:
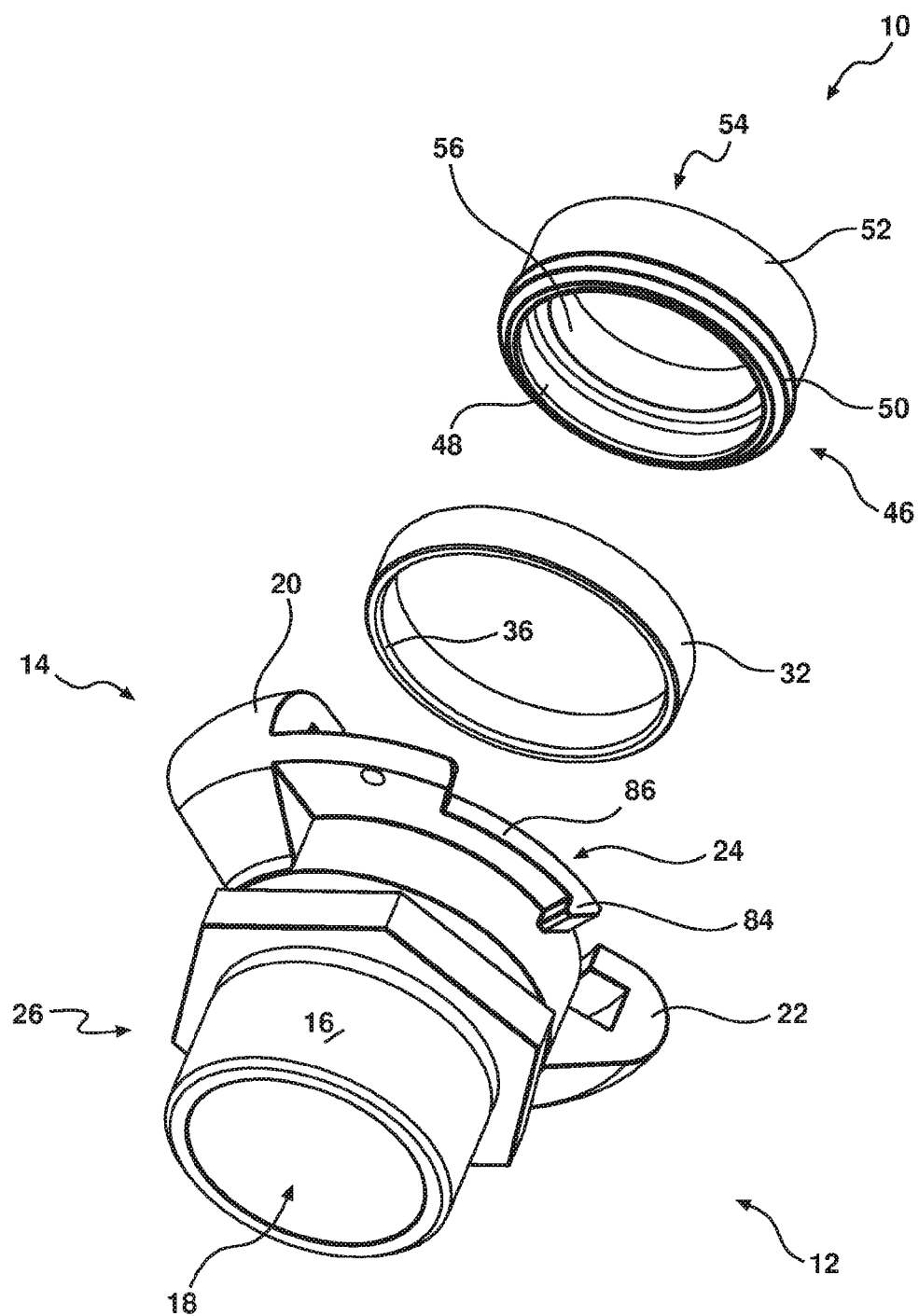
FIG. 1 is an exploded view of the claw coupling, insert and seal of the present invention.
Figure 2:
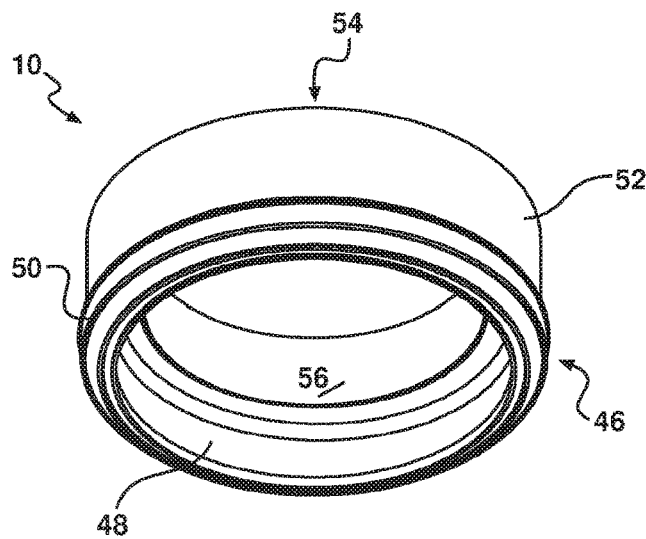
FIG. 2 is an underside perspective view of the seal of FIG. 1.
Figure 3:
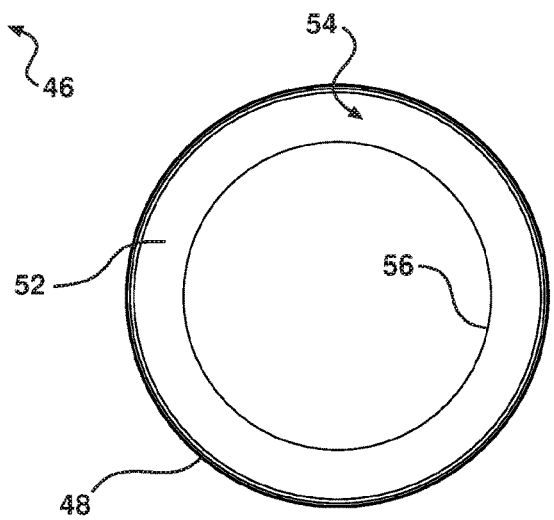
FIG. 3 is a top view of the seal of FIG. 1.
Figure 4:
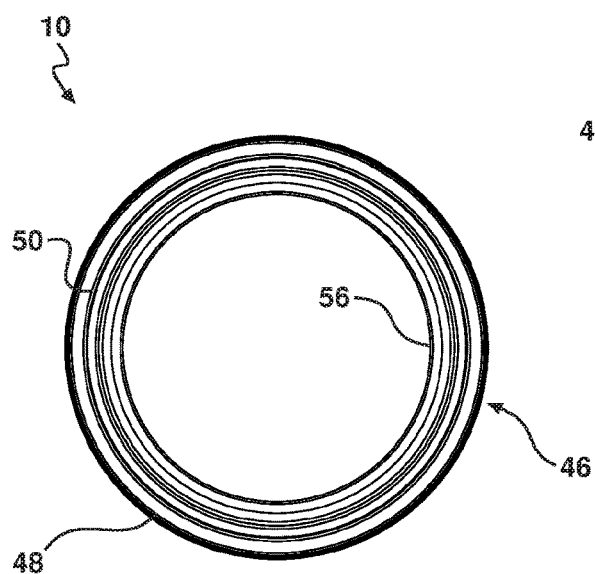
FIG. 4 is an underside view of the seal of FIG. 1.
Figure 5:
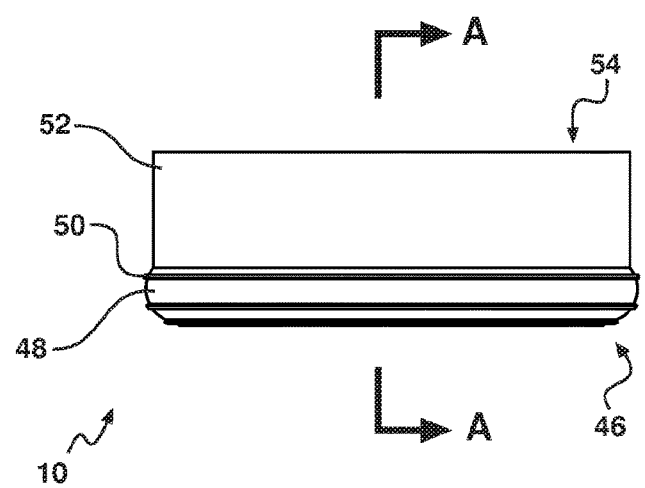
FIG. 5 is a side view of the seal of FIG. 1.

Similar reference characters indicate corresponding parts throughout the drawings. Dimensions of certain parts shown in the drawings may have been modified and/or exaggerated for the purposes of clarity or illustration.

Referring to the drawings for a more detailed description, there is illustrated an annular seal 10 for a pipe coupling 12, demonstrating by way of examples, arrangements in which the principles of the present invention may be employed.

Figure 14:
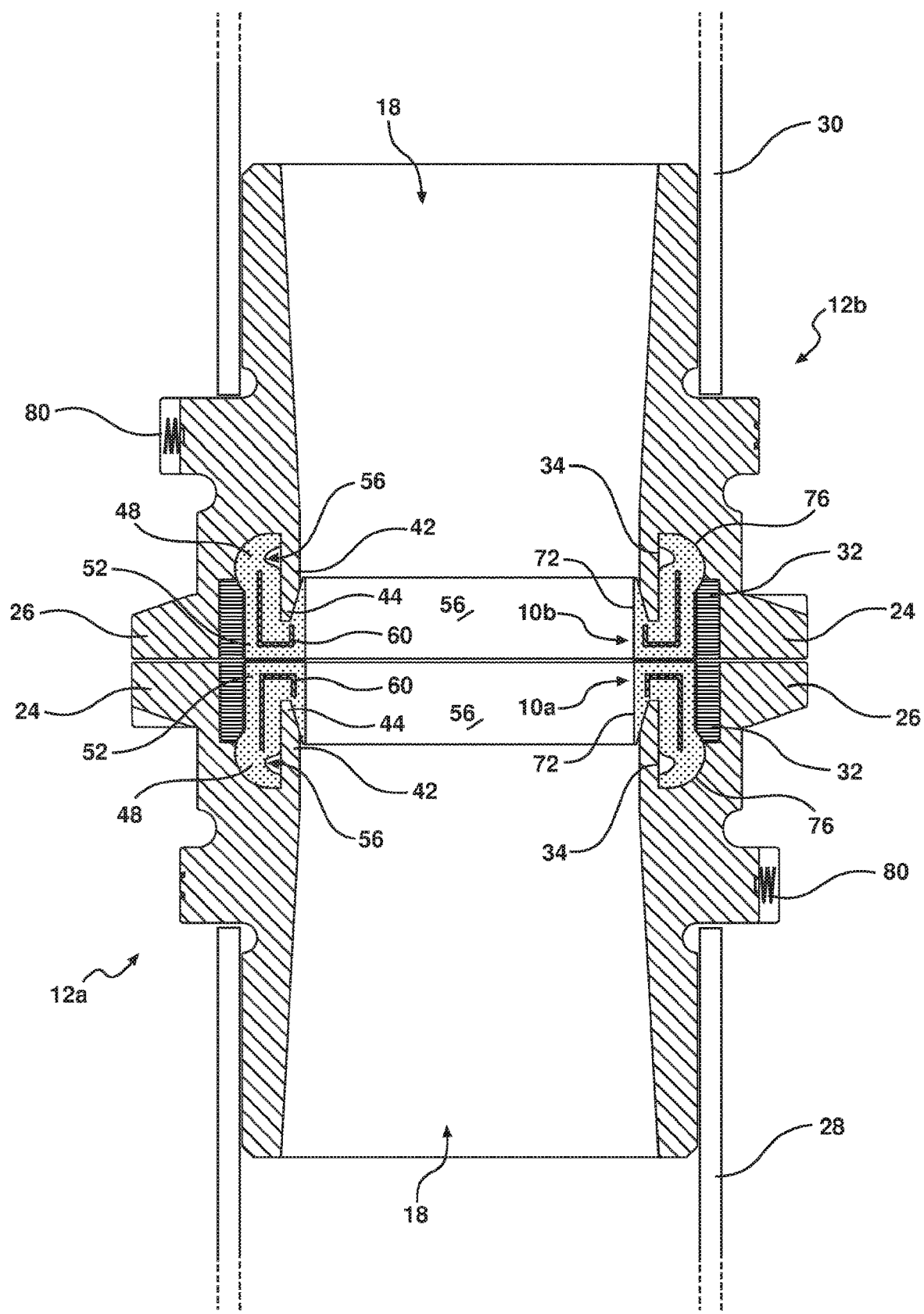
FIG. 14 is a schematic cross-sectional view of two abutting assembled claw couplings, with a respective insert and a respective seal, illustrating the seals in a fully compressed arrangement.
Figure 15:
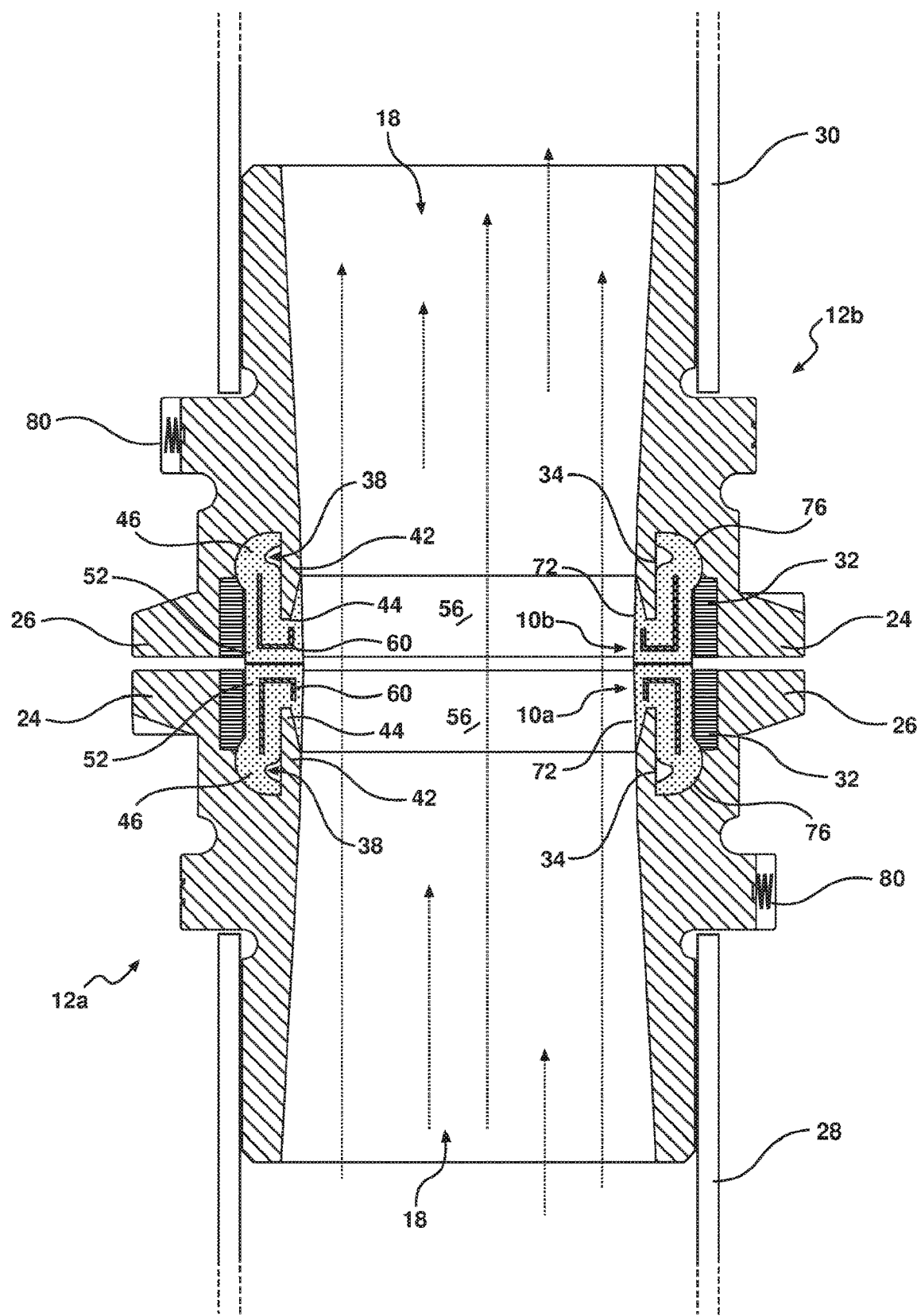
FIG. 15 is a schematic cross-sectional view of the two assembled claw couplings of FIG. 14, in a locked position, illustrating the seals in a partly compressed arrangement.

As illustrated in FIG. 1, the pipe coupling 12 is a claw type coupling which includes, a head 14, a tail 16 and a passageway 18 extending therethrough. The head 14 of the pipe coupling 12 includes two outwardly extending hooks 20, 22 and two sidewardly extending protrusions 24, 26. The hooks 20, 22 on one pipe coupling are configured to engage with protrusions 24, 26 on a cooperating pipe coupling to thereby form an interference fit between the cooperating coupling bodies or fittings to thereby connect length of hoses 28, 30, as illustrated in FIGS. 14 and 15.

An insert 32 is positionable within an upwardly or outwardly open annular groove 34 in the pipe coupling 12, as further illustrated in FIGS. 12 to 15. The insert 32, as shown in FIG. 1, is generally ring-shaped and includes a generally chamfered inner edge 36 for abutment with an outer surface of the annular seal 10.

The insert 32 is positionable with the annular groove 34 to thereby form an enlarged inner annular chamber 38 and a restricted annular neck portion 40. The insert 32 is press fitted and held in place by a bonding agent. The reader should however appreciate that the annular chamber 38 and neck portion 40 of the upwardly open annular groove 34 may be formed without the use of an insert.

The coupling 12 further includes a circular upstand 42 positioned between at least a part of the annular groove 34 and the passageway 18 as illustrated in FIGS. 12 to 15. The reader will appreciate that the circular upstand 42 forms at least part of a side of the upwardly open annular groove 34.

As shown in FIGS. 12 to 15, the circular upstand 42 has a tapered upper circumferential edge 44 having an inner side that slopes outwardly. The circular upstand 42 forms one side of the annular chamber 38 and neck portion 40.

The annular groove 34 is generally coaxial with the passageway 18 and separated therefrom by the circular upstand 42. The annular groove 34 may be formed in the head 14 or the groove 34 may be formed by the placement of a separate annular wall member (not shown) within the coupling that is generally aligned with the passageway, wherein a space between the outer edge of the annular wall member and a side of the coupling forms the groove 34.

The annular seal 10a is positionable within the groove 34 and extends outwardly therefrom for engagement with another seal 10b of a cooperating coupling member, as illustrated in FIGS. 14 and 15.

As the skilled addressee will appreciate, cooperating claw coupling members 12a, 12b of FIGS. 14 to 15, are pushed together, such that the respective seals 10a, 10b are fully compressed, as illustrated in FIG. 14, and the hooks 20, 22 are able to be rotated over respective lips 84 (shown in FIG. 1) of the sidewardly extending protrusions 24, 26 of the opposing coupling. Once the hooks 20, 22 are moved past the respective lip 84, the resiliently deformable seals act on the coupling members 12a, 12b such that the hooks 20, 22 bear against a shoulder 86 (shown in FIG. 1) of the protrusions 24 or 26 and the opposing surfaces of the cooperating coupling members 12a, 12b are spaced apart, by typically around 5 mm, as illustrated in FIG. 15. The reader will therefore appreciate that FIG. 14 shows the two claw couplings in a partially engaged position and FIG. 15 shows the two assembled claw couplings in a fully engaged or locked position.

As illustrated in FIGS. 1 to 6, the annular seal 10 includes a lower portion 46 that is locatable within the annular chamber 38 of the annular groove 34. The lower portion 46 in the present embodiment comprises a bellows type seal part, which includes a circumferential depending projection 48 that is curved outwardly. The lower portion 46 further includes radial ribs 50 that extend around an outer surface of the projection 48, as is known in the art.

Figure 6:
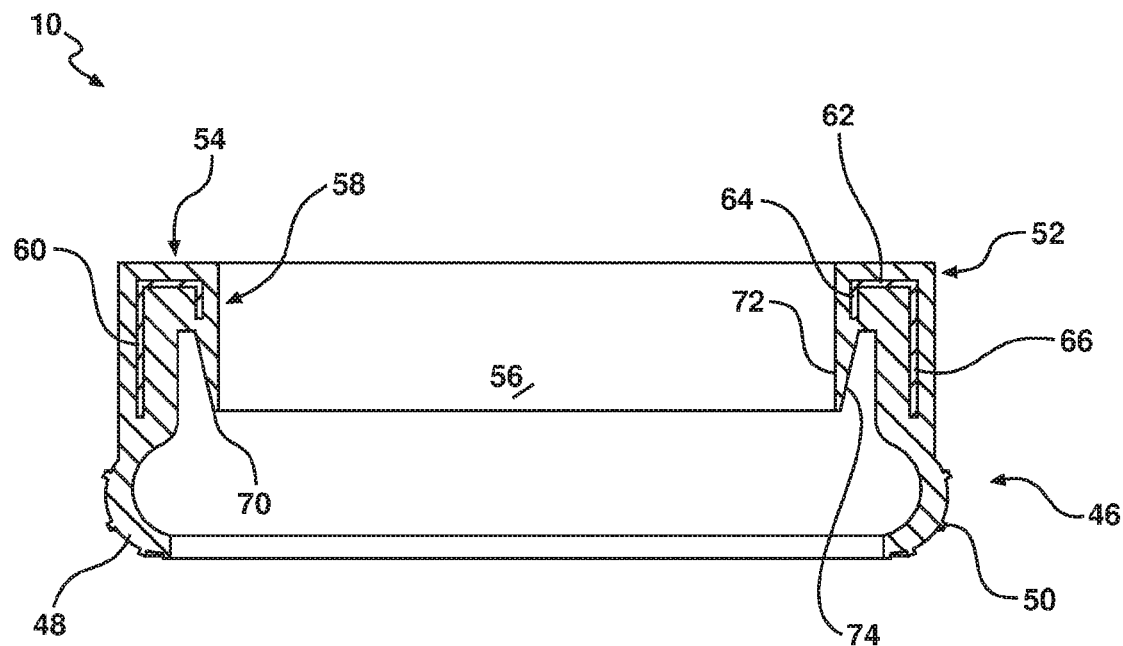
FIG. 6 is a cross-sectional view through A-A of the seal of FIG. 5.

The seal 10 further includes an upper portion 52 having an upwardly or outwardly facing abutment surface 54. An annular skirt 56 adjoins and depends from an inner edge 58 of the upper portion 52, as illustrated in FIG. 6. The depending annular skirt 56 is configured to engage with the circular upstand 42 of the coupling 12, as shown in FIGS. 12 to 15.

As further illustrated in FIG. 6, a stiffening ring 60 is contained within the seal 10. The stiffening ring 60 includes a flat generally annular portion 62, that is generally parallel with the abutment surface 54, an inner circumferential leg 64 and an out circumferential leg 66, wherein both legs 64, 66 depend from the annular portion 62.

Figure 7:
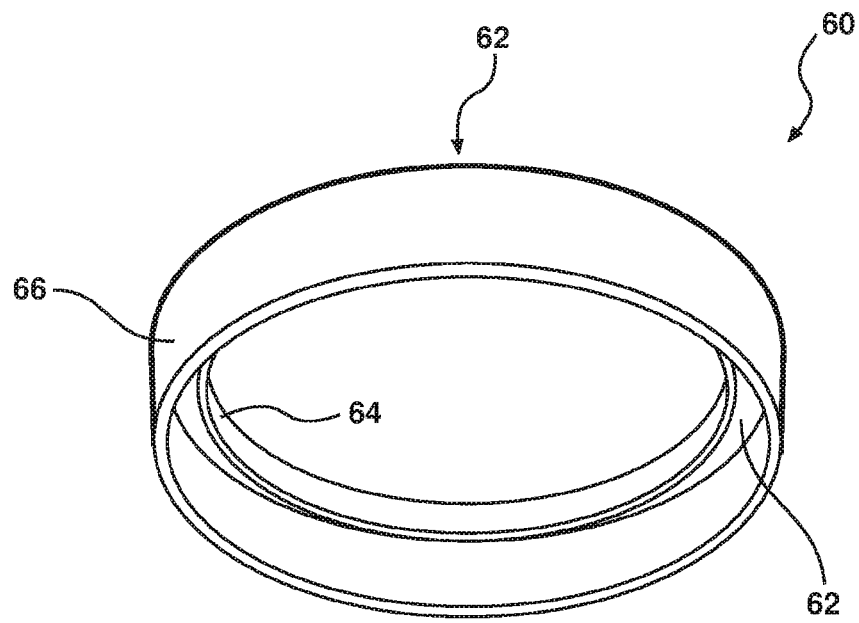
FIG. 7 is an underside perspective view of the stiffening ring of FIG. 6.
Figure 8:
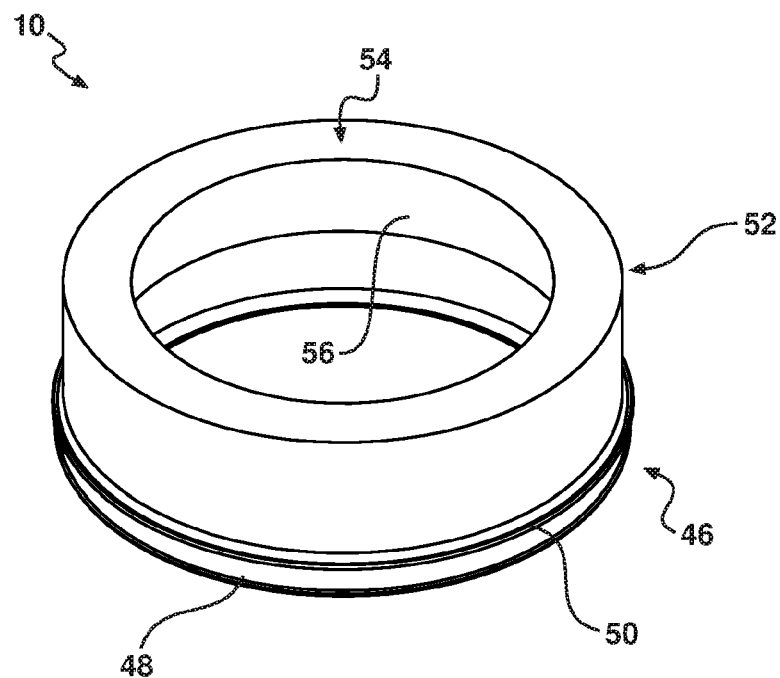
FIG. 8 is a top perspective view of the seal of FIG. 1.
Figure 9:
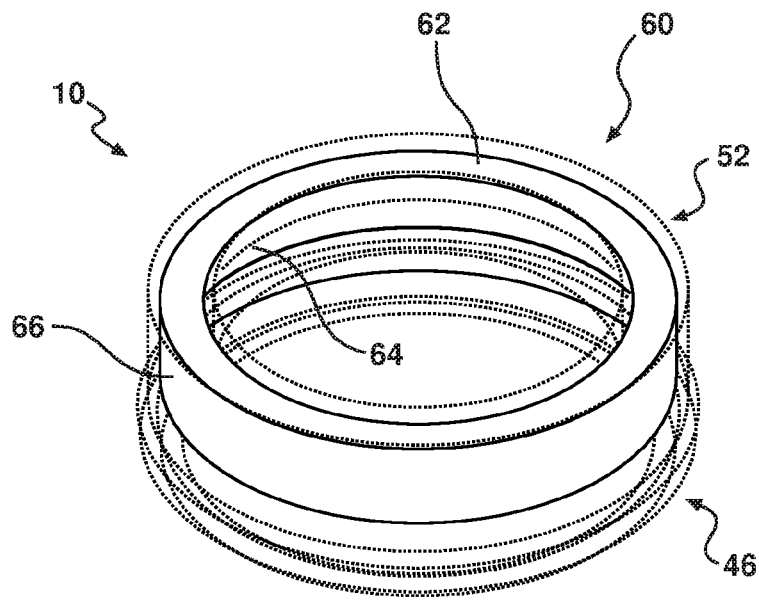
FIG. 9 is a top perspective view of the seal of FIG. 8 illustrating the position of the stiffening ring of FIG. 7 within the seal, which is shown in broken lines.
Figure 10:
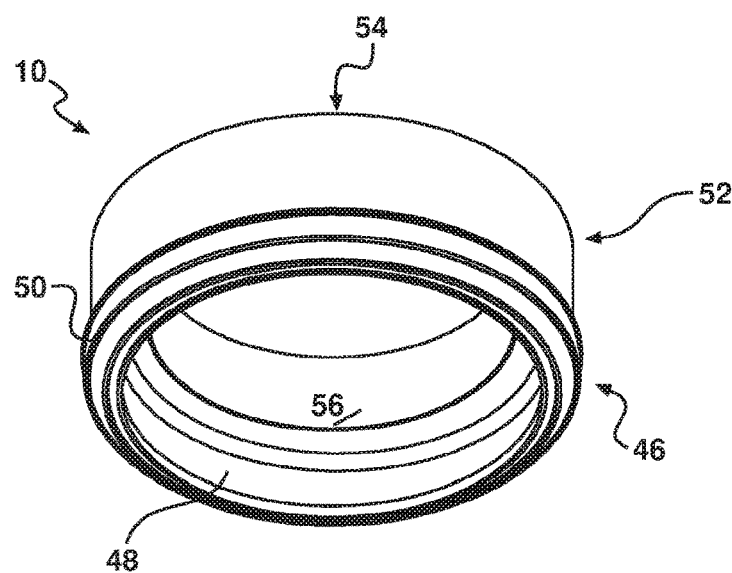
FIG. 10 is an underside perspective view of the seal of FIG. 1.
Figure 11:
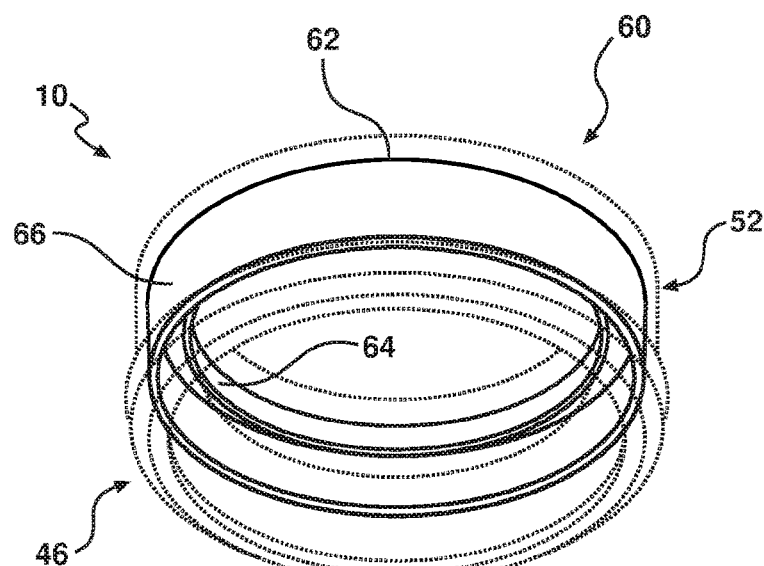
FIG. 11 is an underside top perspective view of the seal of FIG. 10 illustrating the position of the stiffening ring within the seal, which is shown in broken lines.

As illustrated in FIGS. 6 and 7, the depending inner circumferential leg 64 adjoins an inner edge of the flat generally annular portion 62, and the outer circumferential leg 66 adjoins an outer edge of the flat generally annular portion 62. The stiffening ring 60 in one embodiment is unitary and constructed from a metallic material, being press formed and having a thickness of around 0.5 mm.

The reader will appreciate that the stiffening ring 60 has a generally inverted J-shaped cross-sectional profile as illustrated in FIG. 6, however the opposing cooperating coupling will have a seal 10 that is reversed in relation to the description. Accordingly, the terms upper, lower, depending and upwardly may be replace respectively with the terms lower, upper, upwardly extending and downwardly. Therefore, the use of such relative terms in the description and claims in no way could be consider to restrict the scope of the invention.

The outer circumferential leg 66 extends downwardly to a greater extent than the inner circumferential leg 64. As illustrated in FIGS. 6 and 8-11, the outer circumferential leg 66 extends downwardly into or adjacent the lower portion 48 of the seal 10 to provide not only stiffening to the abutment surface 54 but also to at least a part of the lower portion 48. Similarly, the inner circumferential leg 64 extends downwardly into or adjacent the depending skirt 56 to provide reinforcement thereof and to inhibit displacement of the seal 10.

Figure 12:
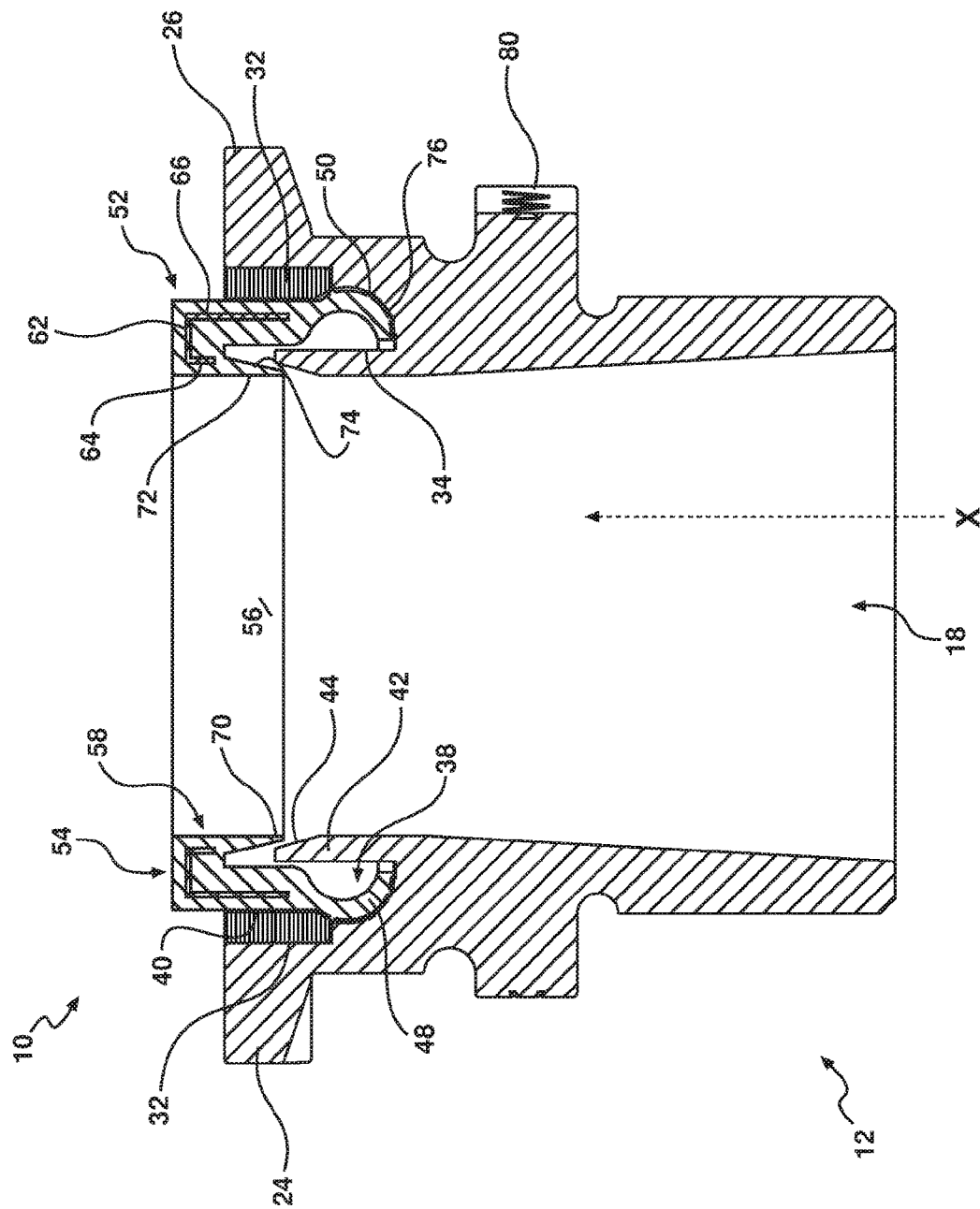
FIG. 12 is a schematic cross-sectional view of the assembled claw coupling, insert and seal, illustrating the seal in an uncompressed arrangement.

As shown in FIGS. 6 and 12, the depending skirt 56 tapers inwardly to a free circumferential edge 70, which is spaced apart from the lower portion 46.

Figure 13:
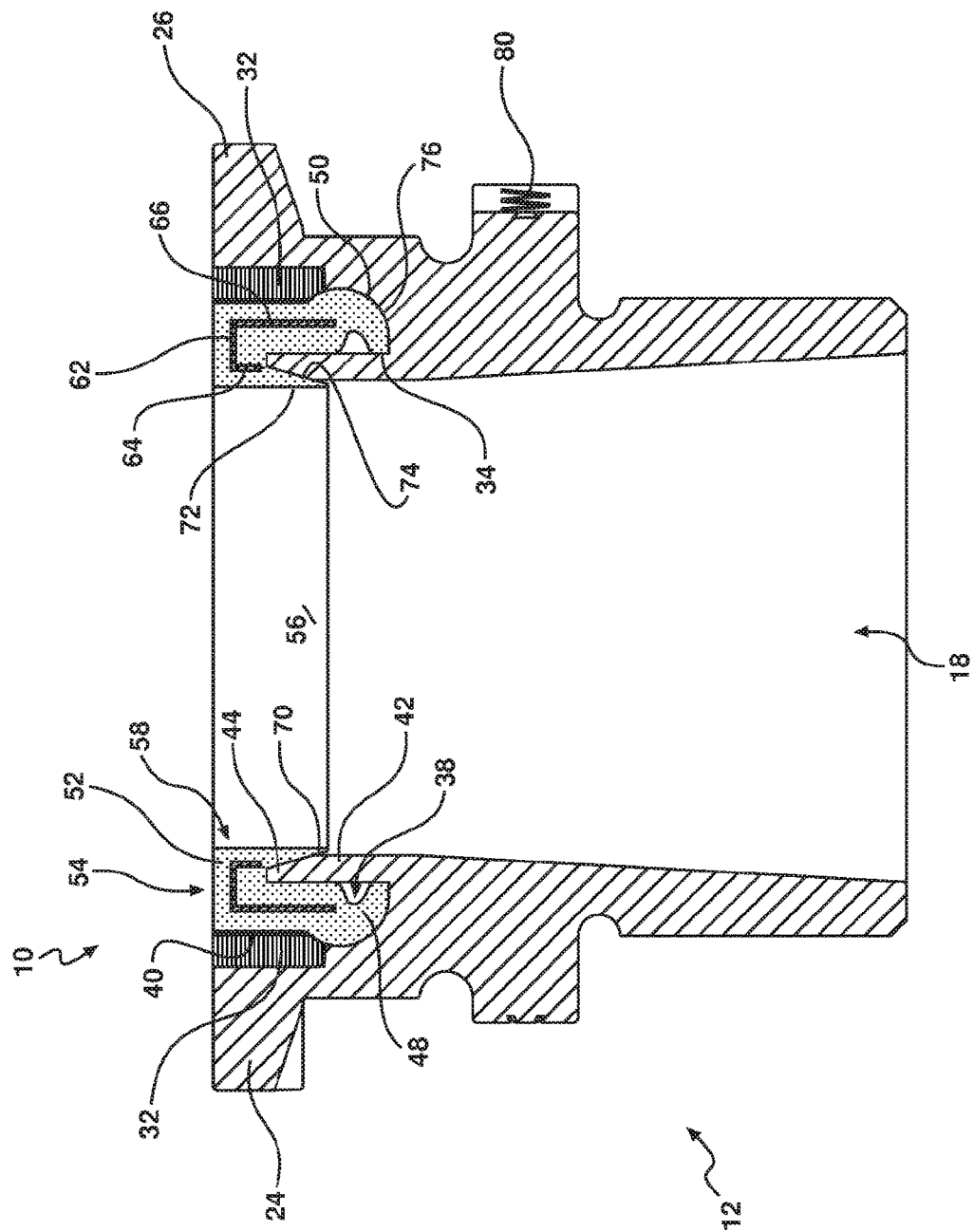
FIG. 13 is a schematic cross-sectional view of the assembled claw coupling, insert and seal of FIG. 13, illustrating the seal in a fully compressed arrangement.

The depending skirt 56 includes an inner side 72 that is configured to be positioned generally parallel with the flow path 'X' through passageway 18. An outer side 74 of the depending skirt 56 is oblique relative to the inner side 72 and is configured to abut with an inner side of the tapered upper circumferential edge 44 of the circular upstand 42, as illustrated in FIG. 13.

As further illustrated in FIG. 12, the curved side 76 of the enlarged inner annular chamber 38 is shaped to abut with the curved projection 48, as is known in the art.

The coupling 12 may also include a pressure relief valve 80 and thread, engagement member or clamp (not shown) for connection to a length of pipe.

When disconnected from a cooperating coupling the seal 10 is biased outwardly from within the annular groove 34, as shown in FIG. 12. Once the cooperating couplings 12a, 12b are connected, as illustrated in FIGS. 14 and 15, the abutment surfaces 54 of the adjacent seals 10a, 10b are caused to impinge upon each other to force the respective upper portion 52 to retract inwardly of the respective annular grooves 34, as shown in FIG. 13.

The pipe coupling 12, also referred to as coupling fittings, are pushed together and twisted so that protrusions 24, 26 engage with and are retained by a respective hook 20 or 22, as is known in the art. This action forces the opposing seals 10 held within respective coupling members 12a and 12b together, whereby the flat abutment faces 54 of the seals 10, are substantially perpendicular to the longitudinal axis of the couplings, and abut when the fittings are joined, as illustrated in FIGS. 14 and 15. This abutment makes a hydraulic or pneumatic seal between the flow paths through the fittings and the surrounding environment.

As can be seen in FIGS. 13, 14 and 15, this compression of the respective seals 10a, 10b causes the tapered skirt 56 to slide down the respective tapered upstands 42. Accordingly, the respective passageways 18 of the cooperating coupling 12 and respective seals 10 are axially aligned to provide a generally smooth or even flow path therethrough.

In this way, when the cooperating couplings 12a, 12b are connected together the respective seals 10a, 10b do not extend significantly into the flow of medium passing through the joint, as indicated by broken arrow in FIG. 15. This configuration minimises turbulence and essentially creates a laminar flow, as indicated by the arrows, while still providing an adequate seal to inhibited leakage of the flowable substance out through the junction between the couplings 12a, 12b.

The tapered skirt 56 is, to a degree, forced laterally against the upstand by the pressure of the flowable substance within the flow path, which substantially inhibits movement of the flowable substance into the groove or cavity 34, which would otherwise cause turbulence. Any flowable substance that is able to force it way through into the groove or cavity 34, such as at low pressure, is inhibited from leaking out of the joint by the bellows type seal configuration of the lower portion 46.

The compression of the deformable lower portion 46 tends to bend and compress the curved projection 48 to thereby provide greater pressure against side 76 of the annular chamber 38 and also upward pressure against the opposing seal to thereby provide a tight fluid or pneumatic seal. The radial ribs 50 are deformable such that they are compressed against the side 76 of the annular chamber 38 and lower edge of the insert 32.

The annular elastomeric portion of the seal 10 is generally coaxial with a generally rigid stiffening ring 60. The lower 46 and upper 52 elastomeric portions of the seal are unitary in construction with the stiffening ring 60 being embedded therein during manufacture.

FIGS. 16 and 17 are included to illustrate the idea of laminar flow 'X' of the present invention and turbulent flow 'Y' of fluid of the prior art along a flow path 18. FIG. 16 illustrates a flow path 18 with generally parallel sides which result in a smooth flow 'X' of fluid along the flow path. On the other hand, FIG. 17 illustrates a flow path 18 with protrusions 88 extending inwardly of the flow path 18 which results in a narrowing, as is the case with the prior art. This narrowing results in turbulent flow 'Y' of the fluid along the flow path 18.

As the skilled addressee will appreciate, the seals of existing claw couplings extend into the flow path. Furthermore, some claw couplings include an annular ridge, that is configured to locate and support a seal. FIG. 18 illustrates a stylised claw coupling 12 of the prior art with annular ridge 90 for supporting the seal 92. The reader will however appreciate that other configurations may currently be on the market or disclosed in the published prior art.

The reader will appreciate from FIGS. 12 to 15 that the claw coupling of the present invention does not include an annular ridge. Therefore, the flow path 18 is generally smooth or regular to thereby improve laminar flow of the liquid therethrough. The configuration of the present invention therefore means that the seal does not extend substantially into the flow path and there is no annular ridge that would restrict flow and increase turbulence, thereby reducing efficiency.

The reader will appreciate that the seal 10 and coupling member 12 of the present invention is compatible with other like couplings having conventional seals, such as type A and type B couplings and couplings sold under the name SURE-LOK™. The seal 10 of the present invention can therefore be incorporated into all three types of claw couplings and thereby will eliminate medium hammer and improve laminar flow. This will create a claw coupling having carbon reduction because laminar flow greatly reduces energy used to pump air/water mediums throughout mine sites. The Inventor envisages that a typical mine site will reduce its energy consumption by use of the seal of the present invention.

The reader should appreciate that the position, shape and configuration of the stiffening ring 60 may vary without departing from the scope of the invention.

Figure 19:
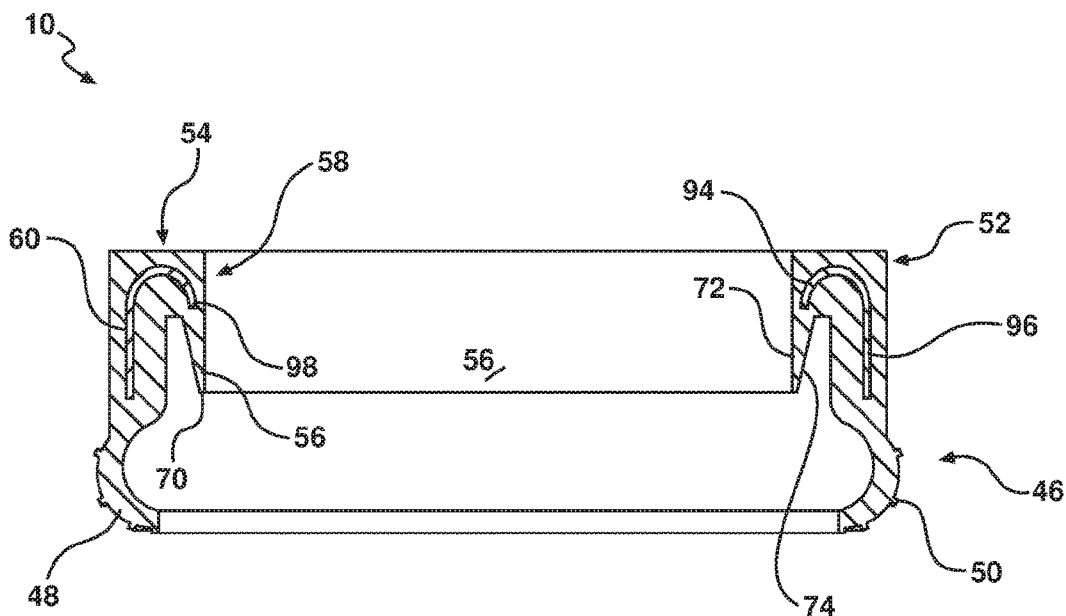
FIG. 19 is a cross-sectional view of the seal of the present invention, illustrating an alternate embodiment of the stiffening ring.
Figure 20:
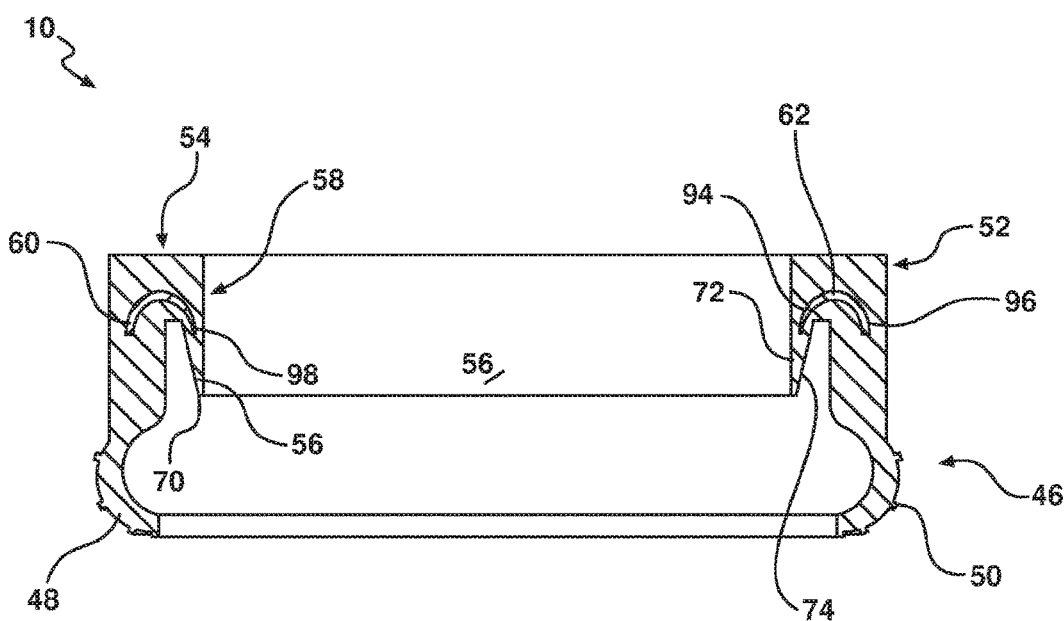
FIG. 20 is a cross-sectional view of the seal of the present invention, illustrating another alternate embodiment of the stiffening ring.

FIGS. 19 and 20 illustrate two alternate configurations of the stiffening ring 60. In FIG. 19 the stiffening ring 60 has an inverted curved J-shaped configuration, with the depending leg portion 94 being shorter than the depending leg portion 96. In the present embodiment the depending leg portion 94 extends towards the depending skirt 56 with an end 98 being adjacent thereto. The reader should however appreciate that the end 98 of the depending leg portion 94 may extend into to the depending skirt 56.

FIG. 20 illustrates another embodiment wherein the stiffening ring 60 has an inverted U-shaped configuration, with the depending leg portion 94 being the same or similar length to the depending leg portion 96. In the present embodiment the depending leg portion 94 extends into the depending skirt 56 and is tapered to an edge 98.

Figure 21:
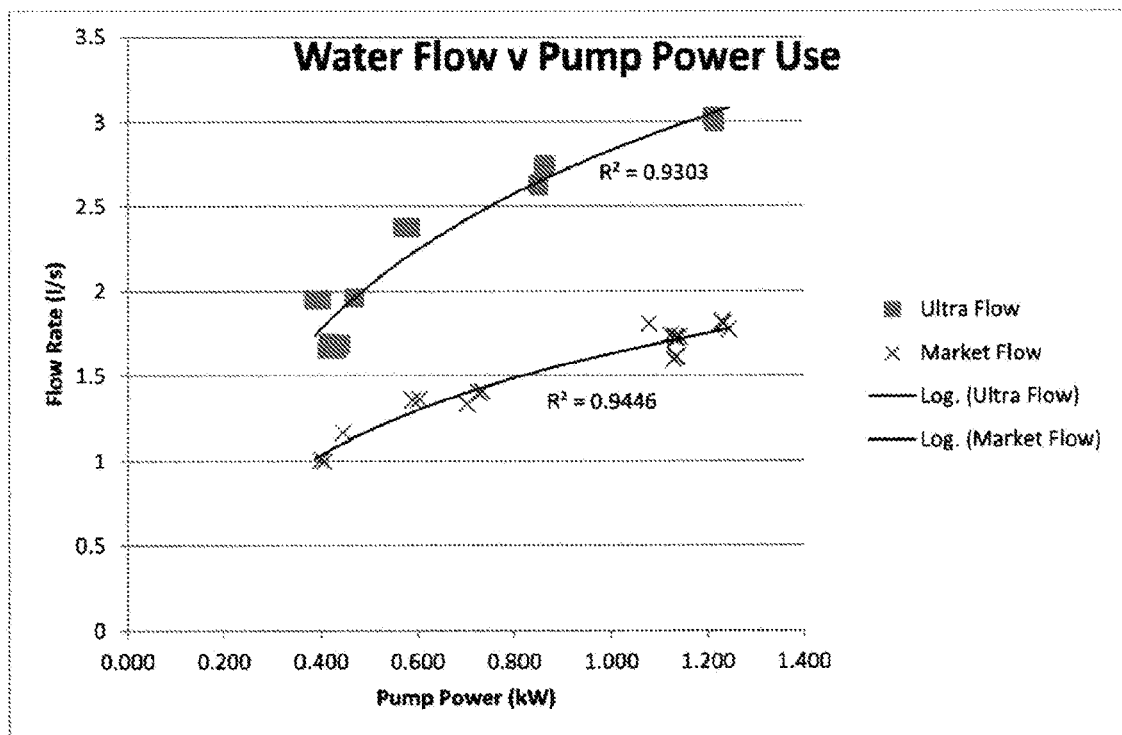
FIG. 21 are the test results of the seal of the present invention ('Ultraflow') compared to a prior art seal ('Market').

FIG. 21 illustrates test results relating to the flow rate of the seal of the present invention ('Ultraflow') compared to a prior art seal ('Market'). The test was undertaken by Bureau Veritas Asset Integrity and Reliability Services Pty Ltd at Thebarton, South Australia.

Test Results

Sample: Ultraflow claw joint fittings 50x, Market claw joint fittings 50x Scope: Comparison of flow rate and pump power usage between Ultraflow and Market fittings.

Method: Pump and return using 2" fittings and hose (water@ 20° C.)

Pump: Warman 3-2 AH WRT centrifugal using Zenith power controller

Flow meter: GE PT900 ultrasonic flow meter

Power meter: Lutron 3 phase power analyser

Results: Results of the flow rate and power tests carried out on the samples supplied by the Applicant are set out in the graph of FIG. 21.

Summary: Ultraflow fittings have 74% better flow rate than equivalent Market fittings at the same pump power settings.

| Sample | Flow Rate l/s at 1 kW |
|---|---|
| Market | 1.63 |
| Ultraflow | 2.83 |

| Sample | Power kW · hr required to move 1000 t of water (1 Ml) |
|---|---|
| Market | 170 |
| Ultraflow | 98 |

The reader will appreciate that the seal 10 is generally moved out of the flow path, with the majority of the seal siting behind a wall or upstand of the coupling. The seal also slides up and down the taper on the wall or upstand 42 and therefore the seal 10 works in conjunction with the coupling to create the sealing function, whilst inhibiting turbulence in the flow of medium.

The skilled addressee will now appreciate the advantages of the illustrated invention over the prior art. In one form the invention provides a reinforced seal that is inhibited from becoming dislodged during use. Furthermore, the seal reduces the formation of vortices or turbulence within the flow path. The tapered skirt of the seal engages with a cooperating shaped tapered upstand to improve engagement and reduce leakage out through the joint of the flowable substance.

Various features of the invention have been particularly shown and described in connection with the exemplified embodiments of the invention, however it must be understood that these particular arrangements merely illustrate the invention and it is not limited thereto. Accordingly, the invention can include various modifications, which fall within the spirit and scope of the invention.

The invention claimed is:

1. A pipe coupling annular seal, comprising:
   a lower portion locatable within an upwardly open annular groove in said pipe coupling;
   wherein the lower portion comprises a bellows portion which includes a circumferential depending projection that is curved outwardly and includes at least two radial ribs that extend around an outer surface of said projection;
   an upper portion adjoining the lower portion and having an upwardly facing abutment surface;
   a skirt adjoining said upper portion circumferentially around an inner edge thereof and depending therefrom, the skirt configured for engagement over a circular upstand of said pipe coupling, the circular upstand being located inwardly of said annular groove, wherein the skirt includes an inner side that is configured to be positionable generally parallel with a flow path of the pipe coupling and an outer side that is oblique relative to the inner side, wherein the outer side is generally configured to abut with an inner side of said circular upstand or a part thereof; and
   a stiffening ring within at least said upper portion of the annular seal, wherein the stiffening ring includes an annular portion that is generally parallel with and spaced apart from the abutment surface and at least one circumferential leg depending from said annular portion.

2. The pipe coupling annular seal in accordance with claim 1, wherein the stiffening ring includes a generally flat annular portion or a curved annular portion, that is positioned generally parallel with the abutment surface.

3. The pipe coupling annular seal in accordance with claim 2, wherein the at least one circumferential leg of the stiffening ring includes an inner depending circumferential leg and an outer circumferential leg, wherein the inner depending circumferential leg adjoins an inner edge of the generally flat annular portion or the curved annular portion, and the outer circumferential leg adjoins an outer edge of the generally flat annular portion or the curved annular portion.

4. The pipe coupling annular seal in accordance with claim 3, wherein the annular portion, the inner circumferential leg and outer circumferential leg are unitary in construction or joined to form the stiffening ring.

5. The pipe coupling annular seal in accordance with claim 1, wherein the skirt tapers inwardly to a free circumferential edge, which is spaced apart from the lower portion.

6. The pipe coupling annular seal in accordance with claim 1, wherein the circular upstand of the pipe coupling is tapered to an upper circumferential edge.

7. The pipe coupling annular seal in accordance with claim 1, wherein the upwardly open annular groove includes an enlarged inner annular chamber and an annular neck portion.

8. The pipe coupling annular seal in accordance with claim 7, configured to be used with an insert that is engageable within the upwardly open annular groove to form a restricted annular neck portion.

9. The pipe coupling annular seal in accordance with claim 7, wherein at least a part of the lower portion of the annular seal is positionable within the enlarged inner annular chamber and the upper portion is configured to extend through and outwardly from a restricted annular neck portion.

10. The pipe coupling annular seal in accordance with claim 7, wherein when installed in the pipe coupling, the abutment surface forces the upper portion to retract inwardly of the neck portion.

11. The pipe coupling annular seal in accordance with claim 10, wherein the compression of the annular seal when located in the annular groove causes the skirt of the annular seal, which is tapered, to slide down the upstand of the pipe coupling, when the upstand is tapered.

12. The pipe coupling annular seal in accordance with claim 1, wherein the stiffening ring is constructed from metal, plastic or rigid/semi-rigid material.

13. The pipe coupling annular seal in accordance with claim 1, wherein the lower portion, upper portion and/or the skirt are/is constructed from a natural rubber an artificial elastomer, or a synthetic rubber copolymer.

14. The pipe coupling annular seal in accordance with claim 13, wherein the lower portion, upper portion and/or the skirt are/is constructed from the synthetic rubber copolymer, and wherein the synthetic rubber copolymer is one of Hydrogenated Acrylonitrile Butadiene (HNBR) and Acrylonitrile Butadiene (NBR).

15. A pipe coupling annular seal, comprising:
a lower portion locatable within an upwardly open annular groove in said pipe coupling;
an upper portion adjoining the lower portion and having an upwardly facing abutment surface;
a skirt adjoining said upper portion circumferentially around an inner edge thereof and depending therefrom, the skirt configured for engagement over a circular upstand of said pipe coupling, the circular upstand being located inwardly of said annular groove, wherein the skirt includes an inner side that is configured to be positionable generally parallel with a flow path of the pipe coupling and an outer side that is oblique relative to the inner side, wherein the outer side is generally configured to abut with an inner side of said circular upstand or a part thereof; and
a stiffening ring within at least said upper portion of the annular seal, wherein the stiffening ring includes an annular portion that is generally parallel with and spaced apart from the abutment surface and at least one circumferential leg depending from said annular portion;
wherein the stiffening ring includes:
a generally flat annular portion or a curved annular portion that is positioned generally parallel with the abutment surface;
an inner depending circumferential leg adjoining an inner edge of the generally flat annular portion or the curved annular portion; and
an outer circumferential leg adjoining an outer edge of the generally flat annular portion or the curved annular portion;
wherein the outer circumferential leg extends downwardly to a greater extent than the inner circumferential leg, whereby the outer circumferential leg extends downwardly into or adjacent the lower portion of the annular seal, and the inner circumferential leg extends downwardly into or adjacent said skirt.

16. The pipe coupling annular seal in accordance with claim 15, wherein the stiffening ring has a generally inverted J-shaped cross-sectional profile.

17. A claw coupling with annular seal, the annular seal comprising:
a lower portion locatable within an upwardly open annular groove in the claw coupling;
wherein the lower portion comprises a bellows portion which includes a circumferential depending projection that is curved outwardly and includes at least two radial ribs that extend around an outer surface of said projection;
an upper portion adjoining the lower portion and having an upwardly facing abutment surface;
a skirt adjoining said upper portion circumferentially around an inner edge thereof and depending therefrom, the skirt configured for engagement over a circular upstand of said claw coupling, and the circular upstand being located inwardly of said annular groove, wherein the skirt includes an inner side that is configured to be positionable generally parallel with a flow path of the claw coupling and an outer side that is oblique relative to the inner side, wherein the outer side is generally configured to abut with the inner side of said circular upstand or a part thereof; and
a stiffening ring within at least the upper portion of the annular seal, wherein the stiffening ring includes an annular portion that is generally parallel with and spaced apart from the abutment surface, and at least one circumferential leg depending from the annular portion.

18. A pipe coupling annular seal, comprising:
an upper portion and a lower portion;
wherein the upper portion includes:
an upwardly facing abutment surface;
an inner surface and an outer surface extending downwardly in a first direction from opposite ends of the abutment surface;
wherein the lower portion extends downwardly from a bottom region of the upper portion in the first direction, wherein an outer surface of the lower portion is continuous with the outer surface of the upper portion;
wherein the lower portion is deformable;
wherein the pipe coupling annular seal further comprises:
an aperture bounded and defined by the inner surface of the upper portion, said aperture being adapted to permit fluid flow therethrough;

an annular groove defined in the bottom region of the upper portion;

a skirt integrally formed with said upper portion and extending downwardly away from the abutment surface in generally the first direction;

wherein the skirt has an inner side and outer side, and the outer side is oblique to the inner side;

wherein the inner side of the skirt is part of the inner surface of the upper portion;

wherein the outer side of the skirt bounds the annular groove; and wherein the skirt is separated from the lower portion by the annular groove.

19. The pipe coupling annular seal in accordance with claim 18, wherein the abutment surface extending between the inner surface and the outer surface is flat; and the inner surface is oriented at a right angle to the abutment surface.

20. The pipe coupling annular seal in accordance with claim 18, further comprising a stiffening ring within at least said upper portion of the annular seal, wherein the stiffening ring includes:

an annular portion that is generally parallel with and spaced apart from the abutment surface; and at least one circumferential leg depending from said annular portion.

\* \* \* \* \*